United States Patent Office 3,389,002
Patented June 18, 1968

3,389,002
HEAT AND CORROSION RESISTANT COATING COMPOSITION
Harold W. Huffcut, Andover, N.Y., assignor, by mesne assignments, to The Air Preheater Company, Inc., a corporation of Delaware
No Drawing. Continuation-in-part of application Ser. No. 236,695, Nov. 9, 1962. This application Jan. 8, 1965, Ser. No. 424,208
5 Claims. (Cl. 106—84)

ABSTRACT OF THE DISCLOSURE

A silica based heat and corrosion resistant coating which may be applied to various materials by spraying, dipping or brushing to provide adequate protection under corrosive conditions at temperatures ranging upward to approximately 2400° F. The coating material consists essentially by weight of from 55% to 68% powdered silica, 25% to 42% potassium silicate, 1% to 4% talc, 1% to 7% nepheline syenite and sufficient water to provide a suitable consistency for the particular type of application desired.

---

This application is a continuation-in-part of my co-pending application No. 236,695 filed Nov. 9, 1962, now abandoned.

The invention relates to a protective ceramic coating of the type adapted for use on a variety of materials which are to be subjected to high temperatures alone or in conjunction with a corrosive atmosphere.

Bare or uncoated metals when exposed to elevated temperatures alone or in conjunction with a corrosive atmosphere are subjected to various forms and degrees of reactions which cause a deterioration of the metal. Various coatings have been developed to provide some degree of protection for the metal under specific operating conditions; however no generally available material has been developed to satisfactorily adhere to and provide continuous protection for metals as they are heated through a wide range of temperatures and subjected to a variety of atmospheric conditions.

The principal object of this invention therefore is to provide a protective coating for the metals effective from room temperatures up to and in some cases beyond 2400° F.

The protective coating may also be applied to a pliable material such as paper that when properly dried will maintain its shape or configuration to which it has been formed prior to its being dried.

An important characteristic of the protective coating defined herein is that it may be satisfactorily applied to base materials other than metallic or ceramic such that the base material will itself be consumed by the elevated temperature while the coating alone will remain and retain the shape into which it has been formed.

A further object of this invention is to provide a coating material that is easily applied and will attain its full range of capabilities without the necessity of being subjected to an involved curing process.

Other objects and advantages of the invention will become more apparent in the course of the following disclosure.

In accordance with the invention the protective coating has as its base 30 to 325 mesh powdered silica blended to provide an effective particle packing. The silica is combined with sufficient potassium silicate solution and water to provide a homogeneous mixture having a predetermined viscosity. To this mixture is added a small amount of talc, a hydrous magnesium silicate. The talc serves to reduce the tendency of the coating material to crack or spall during drying as well as when subjected to mechanical shock. The talc also serves to increase the resistance of the coating to thermal shock throughout a wide range of temperature.

A small percentage of nepheline syenite, an aluminum silicate, added to the mixture creates a wide sintering range, serves to increase the strength of the coating at high temperatures, and in addition varies its coefficient of expansion. Thus by the addition of various small amounts of nepheline syenite to the other constituents that comprise the coating material, its coefficient of expansion may be varied to more closely match the thermal expansion of the base material to which it is to be applied.

The relative parts by weight of the constituent materials may be varied in accordance with the following table to provide a coating of the type herein defined:

| | Percent |
|---|---|
| Powdered silica | 55–68 |
| Potassium silicate solution | 25–42 |
| Talc | 1–4 |
| Nepheline syenite | 1–7 | and water to produce the viscosity desired.

The specific amount of each constituent required may be varied within the range specified to achieve optimum results with respect to the proposed use of the coating material, the temperature at which it will be utilized, and the manner in which it will be applied. Thus a coating material having substantially the same coefficient of expansion as mild steel and generally suitable for temperatures in excess of 2000° F. would include:

| | Percent |
|---|---|
| Powdered silica | 55 |
| Potassium silicate solution | 40 |
| Talc | 1 |
| Nepheline syenite | 4 | and sufficient water to provide a viscosity suitable for the type of application desired.

The above defined mixture in the absence of nepheline syenite would still provide a heat resistant coating suitable for certain applications. However, its resistance to high temperature spalling and cracking would be substantially less than when the nepheline syenite is present in the preferred amount.

A mixture designed to provide a suitable coating for a ceramic base material having a paper-like consistency intended for use at temperatures ranging from 1800° F. to 2200° F. would preferably include:

| | Percent |
|---|---|
| Powdered silica | 63.0 |
| Potassium silicate solution | 28.0 |
| Talc | 2.3 |
| Nepheline syenite | 6.7 | together with sufficient water to provide a viscosity suitable for the type of application desired.

The amount of water necessarily added to any of the above defined mixtures before application to the base material is determined by the manner in which it is to be applied to the base material and the thickness of the coating desired. Thus a thin coating to be applied by spraying would require more water to produce a less viscous mixture than would be satisfactory for applying a thick, heavy coating by dipping or brushing.

The above defined coating will harden quickly and in a generally satisfactory manner when subjected to any of various normal atmospheric conditions. However, when an air hardened coating is subjected to higher temperatures at which oxidation of the coated metal occurs, the coating material will also react by becoming glassy and dissolving the metal oxides to thus provide a durable protective coating which guards against further oxidation of the base metal to which it is applied.

Thus the reaction between the various materials which comprise the protective coating begins to occur at room temperature and continues until an approximate temperature of 1800° F. is reached. As the coating materials are heated to a vitreous state they dissolve or take into solution the products of oxidation which occur at the interface between the coating and its base metal thus protecting the surface of the base metal from further attack.

Although a coating dried in the air at relatively low temperatures may have substantially the same strength and provide substantially the same degree of protection as a coating which has been subjected to elevated temperatures, its chemical composition may vary somewhat due to a continuing thermal reaction of the nepheline syenite.

The properties of the potassium silicate and other constituent materials used in producing the coating of this invention may vary from time to time and thus necessitate a slight modification in the amounts of the various constituents utilized. Thus the potassium silicate solution utilized in the foregoing examples has a molecular ratio of one part potassium oxide ($K_2O$) to 3.29 parts of silica ($SiO_2$) and had a specific gravity of 40.70° Baumé, although a ratio of silica to oxide ranging from two to one to four to one will provide generally satisfactory results.

It is therefore evident that slight variations in the relative amounts of the various constituent materials may be required to compensate for the type of application desired, conditions the coating will be subjected to, and the type of material to be coated. It is therefore intended that all matter contained in the above description shall be interpreted as illustrative only and not in a limiting sense.

I claim:
1. A heat and acid resisting coating material consisting essentially by weight of 63% powdered silica, 28% potassium silicate solution, 2.3% talc and 6.7% nepheline syenite, said potassium silicate having a mole ratio of silica to oxide of from 2 to 1 to 4 to 1.

2. A method of producing a heat and acid resistant coating which comprises the steps of combining by weight of from 55 parts to 68 parts powdered silica, 25 parts to 42 parts potassium silicate solution having a mole ratio of silica to oxide of from 2 to 1 to 4 to 1, 1 part to 4 parts talc, and 1 part to 7 parts nepheline syenite together with water to form a coating material, and applying said material to a surface to be coated.

3. The method of producing an acid resistant ceramic type coating as defined in claim 2 which includes heating said coating to a temperature in excess of 550° F.

4. The method of producing an acid resistant ceramic type coating as defined in claim 2 which includes the step of applying said coating to a mild steel base.

5. The method of producing an acid resistant ceramic type coating as defined in claim 2 which includes the step of applying said coating to a fibrous ceramic material.

References Cited

UNITED STATES PATENTS

| | | | |
|---|---|---|---|
| 1,456,303 | 5/1923 | Ekstrom | 106—84 |
| 2,311,272 | 2/1943 | Ware | 106—84 |
| 2,376,163 | 5/1949 | Metzger | 106—84 |
| 2,760,875 | 8/1956 | Schwartzwalder et al. | 106—62 |
| 2,898,217 | 8/1959 | Selsing | 106—62 |
| 3,093,593 | 6/1963 | Arrance | 106—62 |

TOBIAS E. LEVOW, *Primary Examiner.*

HELEN M. McCARTHY, *Examiner.*

S. E. MOTT, *Assistant Examiner.*